(12) United States Patent
Patel

(10) Patent No.: US 6,850,764 B1
(45) Date of Patent: Feb. 1, 2005

(54) METHOD AND SYSTEM FOR ALLOCATING BANDWIDTH IN A WIRELESS COMMUNICATIONS NETWORK

(75) Inventor: Achal R. Patel, McKinney, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/466,308

(22) Filed: Dec. 17, 1999

Related U.S. Application Data

(60) Provisional application No. 60/112,748, filed on Dec. 17, 1998.

(51) Int. Cl.⁷ .................................................. H04Q 7/20
(52) U.S. Cl. ...................... 455/450; 455/446; 455/452; 455/456; 455/406; 455/524; 455/453; 455/423; 370/468; 370/328
(58) Field of Search ................................ 455/446, 450, 455/452, 456, 406, 524, 453, 423; 370/328, 468

(56) References Cited

U.S. PATENT DOCUMENTS

| | | | | |
|---|---|---|---|---|
| 5,293,640 A | * | 3/1994 | Gunmar et al. | 455/446 |
| 6,223,041 B1 | * | 4/2001 | Egner et al. | 455/452.2 |
| 6,366,780 B1 | * | 4/2002 | Obhan | 455/453 |
| 6,539,221 B1 | * | 3/2003 | Vasudevan et al. | 455/423 |

* cited by examiner

*Primary Examiner*—David Hudspeth
*Assistant Examiner*—David Nguyen
(74) *Attorney, Agent, or Firm*—Baker Botts L.L.P.

(57) ABSTRACT

A method and system for allocating bandwidth in a wireless communications network includes a geo-location tool and an allocation engine. The geo-location tool is operable to receive data for a wireless communications network that includes a plurality of geo-location areas and to estimate bandwidth parameters for a geo-location based on the data. The allocation engine is operable to allocate bandwidth in the geo-location area based on its bandwidth parameters.

58 Claims, 12 Drawing Sheets

METHOD AND SYSTEM FOR ALLOCATING BANDWIDTH IN A WIRELESS COMMUNICATIONS NETWORK

RELATED APPLICATIONS

This application claims the benefit of U.S. Provisional Application Ser. No. 60/112,748, filed Dec. 17, 1998.

TECHNICAL FIELD OF THE INVENTION

The present invention relates generally to the field of wireless communications networks, and more particularly to a method and system for allocating bandwidth in a wireless communications network.

BACKGROUND OF THE INVENTION

Wireline and wireless internet protocol (IP) networks have traditionally supported a best effort delivery of all traffic. To support enhanced services, multiple types, or classes, of services have been established and assigned certain quality of service (QoS) parameters that manage queues for each service type. The QoS parameters include delay, jitter, error rates, and throughput and can be provisioned on a per IP connection or per flow basis through mechanisms such as resource reservation protocol (RSVP) or can be provisioned on aggregate flows which are classified into service classes. The IP QoS architecture provides tools for marking IP flows, controlling and shaping the traffic of various IP flows, and managing various IP queues in order to ensure QoS behavior for each class of service. Queue management algorithms include head-drop, tail-drop, first in first out (FIFO) and random early detect (RED). Internet service providers (ISPs) can utilize the service classes, their associate QoS behavior, and QoS provisioning to provide multiple service offerings to their business and consumer customers.

Recent proposals for the IP QoS architecture include supporting bandwidth brokers that control and allocate internet or other network bandwidth. The bandwidth brokers can be programmed with an organization's policies, current allocation traffic, and new requests for allocations. The bandwidth brokers manage the allocations of bandwidth within their network domain and communicate with bandwidth brokers of other network domains to negotiate QoS parameters.

Wireless communication networks use the IP QoS architecture to support the transmission of data and/or voice traffic between mobile devices and a wireline network. Mobile devices may be located within the wireless network by the use of global positioning satellite (GPS) approaches and other wireless network based approaches.

Proposals for IP QoS on wireless networks have focused on combating the error-prone wireless links. For example, ensuring efficient transport control protocol (TCP) performance over an error-prone wireless links as well as renegotiating QoS parameters and reallocating resources as error rates and/or other error link performance values degrade. The IP QoS architecture for wireless networks, however, does not efficiently allocate bandwidth to mobile devices that move within the coverage area and that cause interference with one another depending on their relative locations in the network.

SUMMARY OF THE INVENTION

The present invention provides an improved method and system for allocating bandwidth in a wireless network that substantially eliminates or reduces problems and disadvantages associated with previous methods and systems. In particular, the present invention uses geo-location information to allocate bandwidth efficiently and cost-effectively in a wireless network.

In accordance with one embodiment of the present invention, a method and system for allocating bandwidth in a wireless communications network includes a geo-location tool and an allocation engine residing on a computer-readable medium. The geo-location tool is operable to receive data for a wireless communications network including a plurality of geo-location areas and to estimate bandwidth parameters for a geo-location area based on the data. The allocation engine is operable to allocate bandwidth in the geo-location area based on its bandwidth parameters.

In accordance with another aspect of the present invention, a method and system for estimating bandwidth requirements and allocating bandwidth in a wireless network includes determining bandwidth demand in an area. Interference contribution caused by the bandwidth usage is then determined. The interference contribution is added to the bandwidth demand and/or usage to estimate bandwidth requirements and allocate bandwidth in the area.

In accordance with yet another aspect of the present invention, a method and system for estimating bandwidth for a mobile device includes determining a bandwidth demand for the mobile device based on a requested service type. An interference contribution caused by the bandwidth demand is then determined based on the location of the mobile device in the wireless network. The interference contribution is added to the bandwidth demand to generate an estimated bandwidth requirement for the mobile device.

In accordance with still another aspect of the present invention, a quality of service (QoS) filter and method are provided for a wireless connection. A location of a mobile device communicating over a wireless connection is received and used to determine QoS parameters for the connection based on the location of the mobile device. Out-of-level traffic is determined for the connection based on the QoS parameters. The QoS parameters may include peak rate, a time of day, and the location of the mobile device.

In accordance with still another aspect of the present invention, a system for allocating bandwidth includes a plurality of first stage queues including a per connection queue and a QoS filter for each of a plurality of connections in an area of a wireless communications network. The connections are each associated with one of a plurality of service classes. A plurality of second stage queues include a per location queue for each of the service classes. An allocation engine is operable to determine allocation bandwidth for each service class based on the bandwidth demand in the first stage queues for the service class and interference contribution caused by the bandwidth demand. The allocation engine is further operable to allocate the allocation bandwidth to an extent available in the second stage queues and to transfer traffic from the first stage queues to the second stage queues.

In accordance with still another aspect of the present invention, an intelligent internet protocol (IP) wireless gateway is provided that includes a bandwidth supply map and an allocation engine. The bandwidth supply map indicates available bandwidth at each of a plurality of geo-location areas in a wireless network. The allocation engine is operable to generate and use the bandwidth supply map to allocate bandwidth to IP connections on a geo-location area basis in the wireless network. The allocation engine is further operable to account for bandwidth interference between IP connections in the bandwidth supply map.

In accordance with still another aspect of the present invention, a method and system for brokering bandwidth in a wireless communications network includes determining bandwidth usage including interference contributions for each of a plurality of areas in the wireless communications network. A real-time bandwidth availability map is generated and maintained for each of the areas based on the bandwidth usage. An additional connection is accepted from an area in response to determining that sufficient bandwidth exists at the location to support the connections.

Technical advantages of the present invention include providing an improved method and system for allocating bandwidth in a wireless network. In particular, the present invention estimates the geo-location specific usage, interference, and demand parameters for mobile devices in the wireless network and allocates bandwidth based on geo-location, allocation policies, and service class. Geo-location specific bandwidth allocation enhances the overall utilization of a wireless network to support various classes of traffic including, but not limited to, world wide web (WWW) browsing, Internet protocol (IP) telephony, Internet access, intranet access, file downloading, and e-mail and maintains stability of the wireless network in high traffic conditions. In addition, a network or resource owner may develop and serve a location specific service market. For example, the network owner may contract to provide an office building, a local cafe, a sports arena, or other entity with local wireless access.

Another technical advantage of the present invention includes brokering bandwidth to service providers and consumers. In particular, real-time and geo-location specific bandwidth estimates are determined and provided to a network or resource owner. The network owner may then broker excess bandwidth or acquire needed bandwidth. As a result, the network or resource owner can optimally utilize its assets in time and space.

Yet another technical advantage of the present invention includes providing accurate estimates of location-specific bandwidth availability, tools for estimating the location-specific demand via source profiling and usage profiling, and establishing QoS policies that are location, application, and class specific. In particular, a source map is developed indicating the potential geo-locations of specific sources of bandwidth usage, such as office buildings, highways, and/or local businesses with wireless access. Such geo-location sources can be predetermined or can be generated as a natural consequence of usage. Subscriber usage profiles indicate the likelihood of the geo-location of a particular subscriber, the likelihood of its call holding time, the likelihood of its mobility or change in geo-location over time, service class invocation, and other parameters obtained via historical and other data. A current usage map indicates the real-type bandwidth being utilized at various geo-locations. An expected demand map uses the current usage map, usage profiling, and source maps to develop expected demand at the various geo-locations. An interference contribution map indicates an impact on resource usage of supporting various service classes at specific geo-locations. A bandwidth supply map uses the expected demand map, interference contribution map, current usage map, source map, specific allocation and queue management policies, service-class specific QoS mechanisms, and the specific geo-locations of allocation requests to determine bandwidth supply.

Still another technical advantage of the present invention includes providing a method and system for estimating the bandwidth requirement of a device. In particular, the bandwidth requirement is determined based on the class of service, geo-location, and interference contributions of the device. As a result, bandwidth can be accurately determined and allocated to mobile devices within a mobile network.

Still another technical advantage of the present invention includes providing an intelligent IP wireless gateway. In particular, IP QoS agreements and mechanisms are mapped with IP and QoS management to form intelligent wireless gateways. These intelligent IP wireless gateways are IP gateways that are aware of time-varying and location-specific bandwidth in a wireless network.

Other technical advantages of the present invention will be readily apparent to one skilled in the art from the following figures, description, and claims.

BRIEF DESCRIPTION OF THE DRAWINGS

For a more complete understanding of the present invention and its advantages, reference is now made to the following description taken in conjunction with the accompanying drawings, wherein like reference numerals represent like parts, in which.

DETAILED DESCRIPTION OF THE INVENTION

Figure 1:
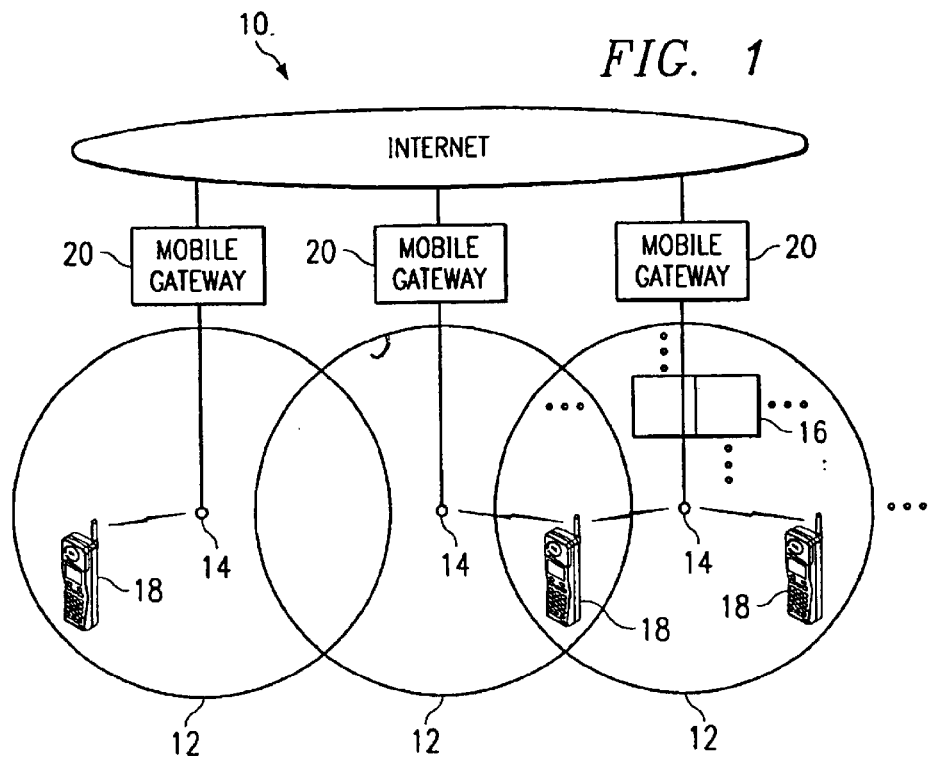
FIG. 1 is a block diagram illustrating a wireless network in accordance with one embodiment of the present invention.

FIG. 1 illustrates a wireless network 10 in accordance with one embodiment of the present invention. In this embodiment, the wireless network 10 is a cellular network in which terrestrial wireless transmission originates in geographically delimited cells. It will be understood that the present invention may be used in connection with other suitable wireless networks.

Referring to FIG. 1, the wireless network 10 covers a contiguous area that is broken down into a series of overlapping cells 12. Each cell 12 has a base station, or server, 14 and may be subdivided into a plurality of geo-location areas 16. The geo-location areas 16 are each a defined area in which bandwidth may be allocated to mobile devices. The geo-location areas 16 may have a resolution greater than, less than, or equal to cell size. In a particular embodiment, the geo-location areas 16 are substantially square in shape to form a contiguous grid over the coverage area. Thus, the geo-locations 16 may be shared by one or more cells 12.

Each server 14 provides a radio frequency (RF) link for mobile devices 18 within its cell 12. The wireless RF link to the mobile devices 18 in the cell 12 may be based on established standard such as IS-54 (TDMA), IS-95 (CDMA), GMS and AMPS, 802.11 based WLAN, or new upcoming standards such as CDMA 2000 and W-CDMA or proprietary radio interfaces. The mobile devices may be cell phones, data phones, data devices, portable computers, or any other suitable device capable of communicating information over a wireless link. Due to the nature of the RF airlink, the interference generated by the usage of various mobile devices 18 is inter-dependent. That is, the interference generated by the usage of a mobile device 18 including transmittal and receiving signals is not only dependent on its geo-location, but is also dependent on the geo-location of surrounding mobile devices 18 and the usage of those devices. Thus, the cellular network is an inherently interference-limited network with bandwidth usage in a particular location impacting the interference in specific areas of the neighborhood. In the complete spectrum sharing systems such as CDMA and W-CDMA, bandwidth usage in a particular area directly impacts the bandwidth available at different locations in the neighborhood.

The servers 14 each have a defined bandwidth with which to communicate with the mobile devices 18 in the cells 12. The bandwidth is used by the server 14 and the mobile devices 18 to communicate voice and data information. The supported bandwidth is a function of various factors such as frequency reuse, carrier to interface ratio, bit-energy to noise ratio, effective bit-rate per connection and the like. In accordance with the present invention and as described in more detail below, the bandwidth available to allocate to certain flows is geo-location dependent, and time dependent based on current usage of other flows in the geo-neighborhood.

The servers 14 are each connected to a mobile gateway 20 that allocates bandwidth within the wireless network 10, routes traffic, and tracts the location of the mobile devices 18 in the cells 12. The position of a mobile device may be determined using network-assist, global position systems (GPS) and radio frequency fingerprinting. Preferably, the positioning technique provides fast and accurate information with respect to the location of the mobile device 18 to minimize acquisition time for position information. As mobile users move from cell 12 to cell 12, a hand-off operation between base stations 14 is performed by the mobile gateway 20.

The mobile gateway 20 provides connectivity from the wireless network 10 to a wireline network 24 via circuit switched and packet switch wireless data protocols. The wireline network 24 may be the Internet, intranet, extranet, or other suitable local or wide area network. For the internet, the mobile gateway 20 provides an access, or entry point for all transport control protocol/internet protocol (TCP/IP) data connections to the wireless network. Each mobile gateway 20 may serve one or more servers 14. Bandwidth allocation and other functionality of the mobile gateways 20 may instead be implemented by a mobile switching center (MSC), data interworking function (IWF) devices, and other suitable network devices without departing from the scope of the present invention.

Figure 2:
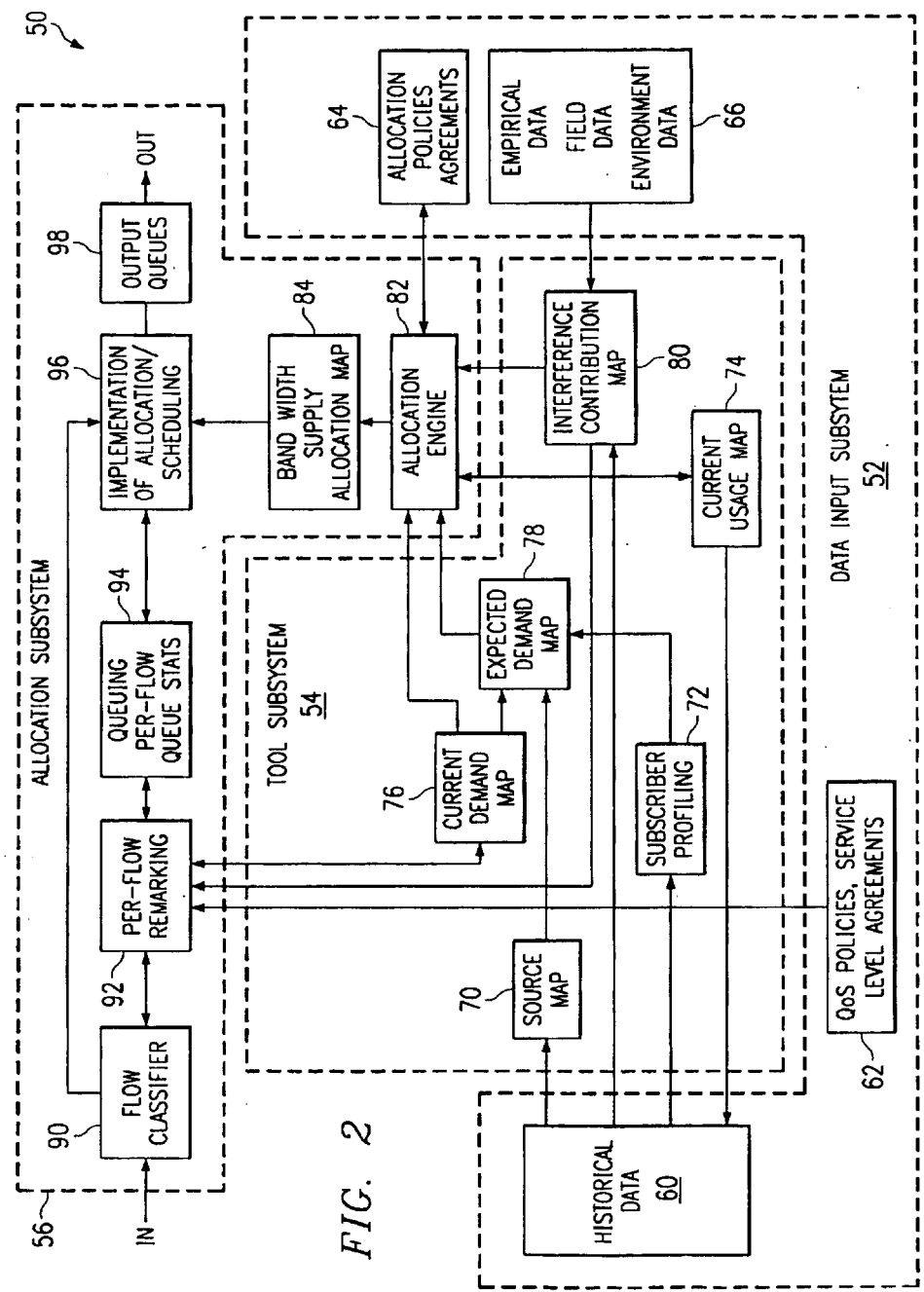
FIG. 2 is a block diagram illustrating a system for allocating bandwidth within the wireless network of FIG. 1 in accordance with one embodiment of the present invention.

FIG. 2 illustrates a bandwidth allocation system 50 for the wireless network 10 in accordance with one embodiment of the present invention. In this embodiment, the bandwidth allocation system 50 comprises software stored on a computer-readable medium. The software includes programs, modules, functions, database tables and entries, data, routines, data storage, and other suitable elements that may operate in the mobile gateway 20 or be distributed between components of the wireless network 10. As described in more detail below, the bandwidth allocation system 50 combines geo-location information with a dynamic bandwidth allocation and queue management mechanism to deliver location-specific bandwidth efficiently and cost-effectively.

Referring to FIG. 2, the bandwidth allocation system 50 includes a data input subsystem 52, a geo-location tool, or subsystem, 54 that uses data from the input subsystem 52 to generate maps, profiles, and other geo-location specific tools, and an allocation subsystem 56 that uses the tools generated by the geo-location tool 54 to implement allocation and scheduling of wireless traffic in the wireless network 10. The data input, tool, and allocation subsystems 52, 54, and 56 combined geo-location information with a dynamic bandwidth allocation and queue management mechanism to deliver location-specific bandwidth efficiently and cost-effectively.

The data input subsystem 52 provides historical, empirical, field, environmental, statistical, and other suitable data on or related to the operation of the wireless network 10 or components within the wireless network 10 that can be used to estimate bandwidth demand, use, and interference within the wireless network 10. In one embodiment, the data input subsystem 52 includes historical data 60, QoS policies and service level agreement information 62, allocation policy agreement information 64 and empirical, field, and environmental data 66. The historical data 60 provides historical performance data on the operation of the wireless network 10. The historical data 60 is connection data gathered from a switch, router, or other component external to and/or within the wireless network 10. The historical data 60 may include for each connection a time of day, call/service type, location, time until move or change in location, and completion time. The QoS policies and service level agreement information 62 provide information on service level agreements and QoS policies of the business and consumers for the wireless network 10. The allocation policy agreement information 64 provides allocations policies and agreements for the wireless network 10. Provision of the policies and agreement information 62 and 64 allows contractual obligations to be accounted for in allocated bandwidth within the wireless network 10. The empirical, field, and environmental data 66 provides information that may be used along with historical data 60 to allocate bandwidth within the wireless network 10. In one embodiment, the empirical, field, and environmental data 66 includes empirical data per service type, location-specific RF measurements, and location-specific interference estimates. The empirical, field, and environmental data may be taken from measurements within the wireless network 10, other suitable components internal and/or external to the wireless network 10, or treatises and statistical information available for wireless networks.

The geo-location tool 54 processes input data to determine current and/or expected location-specific bandwidth demand and/or use. In the illustrated embodiment, the geo-location tool 54 provides maps and profiles that are used to determine allocation and/or scheduling of traffic in the wireless network 10. The maps may be graphical maps, database entries indexing the relevant information, and/or other suitable representations of the data. In one embodiment, the tool subsystem 54 includes a source map 70, a subscriber profile 72, a current usage map 74, and expected demand map 78, a current demand map 76, and an interference contribution map 80. In this embodiment, tool subsystem 54 utilizes some or all of the profiles and maps to allocate traffic on a per location and per class basis.

As described in more detail below, the source map 70 characterizes bandwidth sources within a geo-location area across time. The subscriber profiling 72 provides a profile as to each subscriber's location, likelihood, or probability of mobility and handoffs, likelihood of call hold time, class of service and vocation, and the like. The current usage map 74 indicates the current usage and performance at specific geo-location areas. The current demand map 76 indicates the resource request at various geo-location areas at the current time. The expected demand map 78 projects the expected resource request for a specified time in the future. The expected demand map 78 may be generated from the source map 70, subscriber profile 72, and the current demand map 76. The interference contribution map 80 maintains data on the probability of interference contribution to one or more servers 14 and the value of interference contribution to the one or more servers 14.

The allocation subsystem 56 allocates bandwidth on a per flow, or per connection basis based on maps and profiles generated by the tool subsystem 54 as well as other available data. Accordingly, bandwidth is allocated on a per class and per location basis. In one embodiment, the allocation subsystem 56 includes an allocater 82, bandwidth supply allocation map 84, a flow classifier 90, a per-flow remarking engine 92, queuing information 94, and allocation implementation engine 96, and output queues 98. The allocater 82, allocation implementation engine 96, and/or other or different components of the allocation subsystem 56 form an allocation engine for performing location-specific allocation in the wireless network 10.

The allocater 82 generates a bandwidth supply allocation map 84 based on the current usage map 74, current demand map 76, expected demand map 78, and the interference contribution map 80. The bandwidth supply allocation map 84 indicates the amount of bandwidth that is potentially available at each geo-location area in the coverage area and is updated as available supply is utilized.

The flow classifier 90 marks the incoming packets into various classes or service types. The per-flow remarking engine 92 remarks the packets based on the per-flow queue statistics 94, the QoS policies and service level agreements 62, the interference contribution map 80, and the current demand map 76. The allocation implementation engine 96 allocates the supplied bandwidth to the respective output queues 98 for a specific geo-location area. Further information on queue management and the interaction of supply allocation with queuing is described in more detail below in connection with FIG. 11.

In operation of the allocation system 50, the supply allocation map 84 is determined via the use of the expected demand map 78, current demand map 76, interference contribution map 80, current usage map 74, and service-level agreements or specific static and/or dynamic allocation policies 64. Upon supply allocation, the current usage and performance map 74 is updated in time to reflect the real-time usage of bandwidth in geo-location areas and time. The current usage and performance map 74 is also used to maintain the historical database 60. This historical database 60 in turn is utilized to update the source map 70 for each geo-location area, subscriber profiling 72, QoS policies and behaviors 62 and allocation policies 64.

Figure 3:
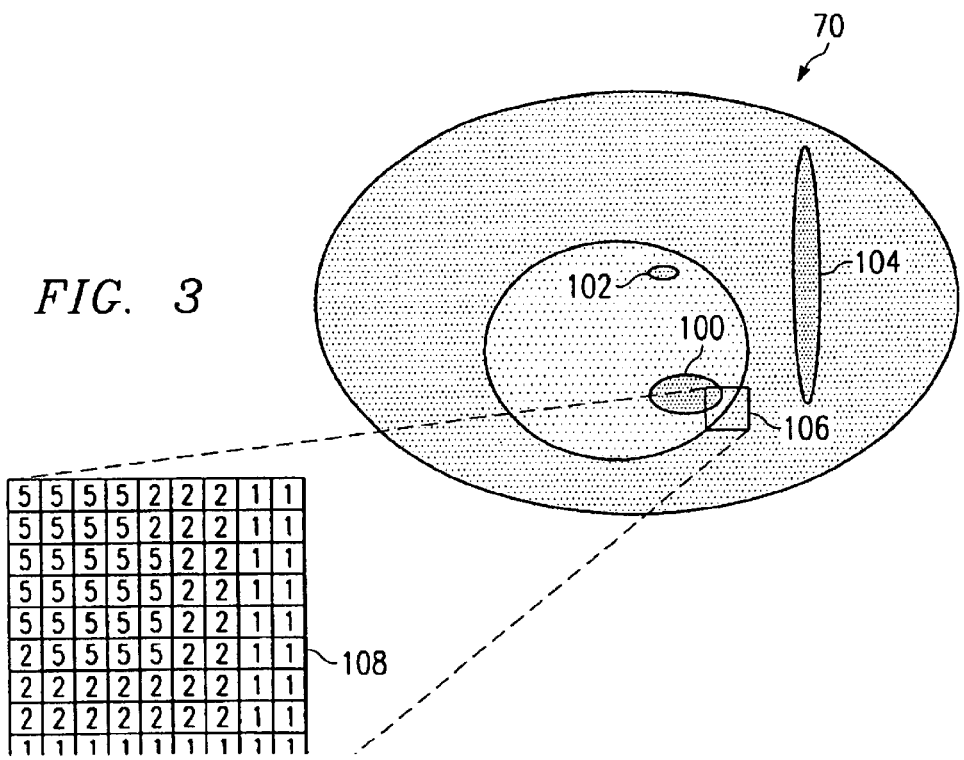
FIG. 3 is a graphical diagram illustrating the source map of FIG. 2 in accordance with one embodiment of the present invention.

FIG. 3 illustrates the source map 70 for a geo-location area in accordance with one embodiment of the present information. In this embodiment, the source map 70 is graphically displayed. The source map 70 may instead be represented by data in a database table or other suitable data store. As previously described, the source map 70 identifies bandwidth sources within a geo-location area across time.

Referring to FIG. 3, the source map 70 is generated and maintained for locations of specific sources of usage such as a high population facility with wireless office access 100, a local business such as a restaurant or café 102 with local wireless access service guarantees, highways, and other traffic routes 104 and the like. The high population facility may be an office building, business park, business or educational campus, mall, specific residential area and subdivision, base, air or sea port, arena, and the like.

In one embodiment, as illustrated by zoomed area 106, the source map 70 is subdivided into a plurality of bins 108 arranged in a grid pattern. The data in the source map 70 may be generated and maintained on either a per-bin resolution or may be aggregated over several bins and updated as the data per bin changes. In a particular embodiment, each bin 108 indicates a specific source value that provides the relative bandwidth usage of structures in the bin 108. In this embodiment, a bin 108 with a value 5 represents five times the bandwidth consumption relative to the bin with value 1. At a minimum, the source map 70 should include the peak rate for bins 108 within each geo-location area. It will be understood that bandwidth usage may be otherwise indicated in the source map 70.

The source map 70 is analogous to a contour map in which bandwidth hot spots or geo-locations or sources such as a kiosk supply mobiles a high quantity of data. As a user, or subscriber, passes a high bandwidth source geo-location, its bandwidth consumption behavior may be modified by the requirement to link into the high bandwidth source. The source map 70 can be generated from predetermined sources such as allocated services agreement for specific office buildings 100 and local businesses 102. This information can be combined with operational data from the wireless network 10, demographic data for the coverage area and government and other statistics on traffic patterns and behaviors along a highway, downtown area, mall, or other area at different points in time.

Figure 4:
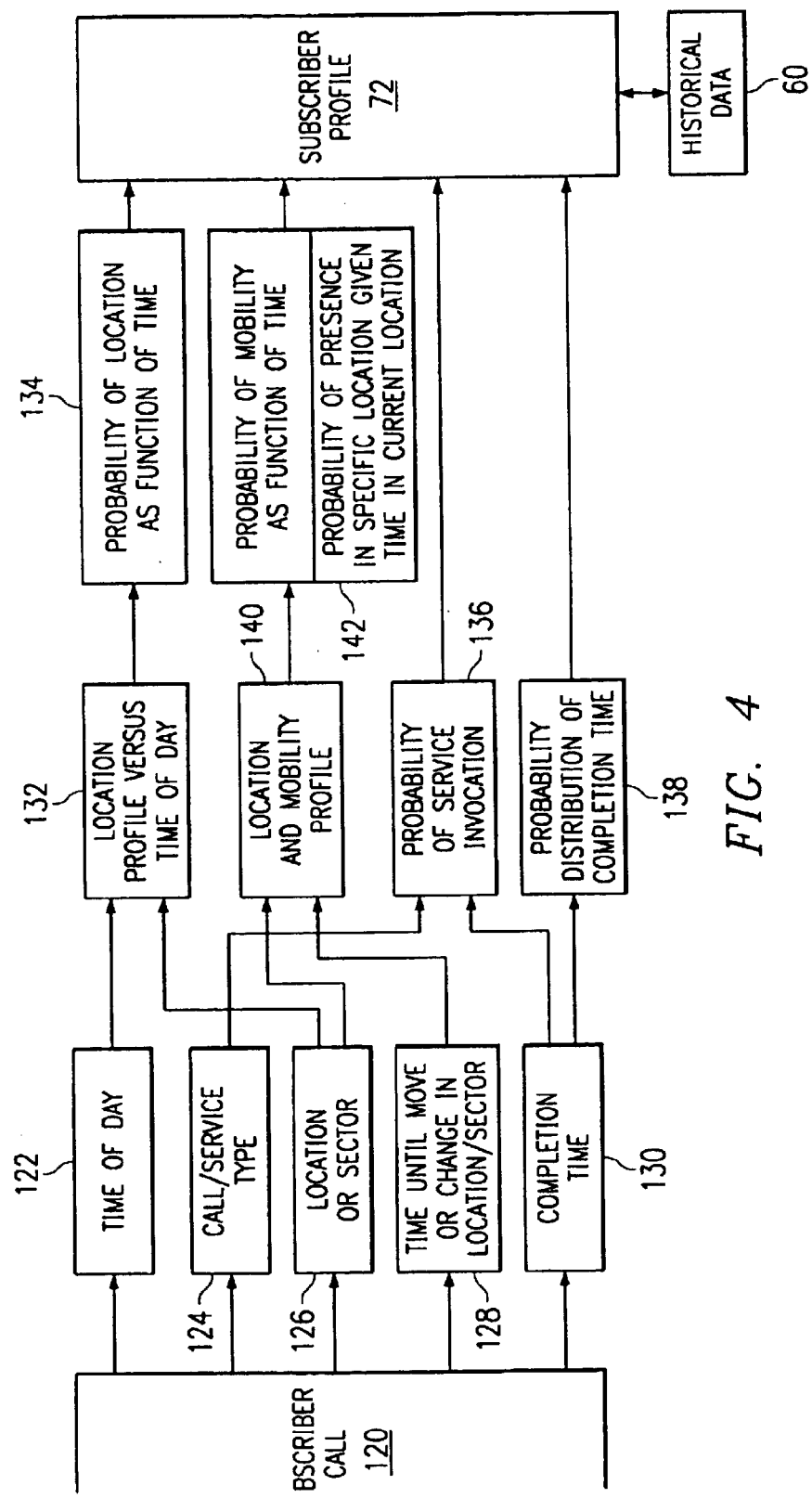
FIG. 4 is a flow diagram illustrating development and maintenance of the subscriber profiles of FIG. 2 in accordance with one embodiment of the present invention.

FIG. 4 is a flow diagram illustrating development and maintenance of subscriber profiles 72 in accordance with one embodiment of the present invention. In this embodiment, the subscriber profiles 72 are stored in a database table indexed by subscriber. The entry for each subscriber stores probabilities of the subscriber's location, likelihood of mobility and/or handoffs, likelihood of call hold time, class of service invocation and the like at each point in time. The subscriber profile 72 should include at least enough information to allow the allocation system 50 to predict when and where each subscriber will initiate connections, as well as, the mobility, bandwidth and duration of the connections.

Referring to FIG. 4, for each subscriber call 120, the data on the time of day 122, caller service type 124, location of origination 126, time until move or change in location 128, and completion time 130 are recorded. As used herein, the term each means every one of at least a subset of the identified items. The data on the time of day 122 and the location 126 are used to develop a location profile versus time of day 132 which in turn is used to estimate the probability of presence in a certain location as a function of time 134. The data on call or service type 124 along with a completion time 130 are used to estimate the probability of service type invocation 136 of a particular subscriber. The data on the completion time 130 is also used to estimate the probability distribution function of the completion time 138. The data on the location of origination 126 and time until move or change in location 128 is used to develop a location and mobility profile 140. The location and mobility profile 140 is used to estimate the probability of mobility as a function of time 142 and to estimate the probability of presence of the subscriber in a specific location given presence for a period of time in the current location.

The probability estimates of initial location versus time 134, probability of service or call type invocation 136, probability distribution of call completion time 138, and probability estimates related to mobility 142 collectively form a subscriber profile 72. This subscriber profile 72 is recorded in the historical data 60 and combined with new data for each connection to continuously enhanced from historical data 60 for the particular subscriber.

Figure 5:
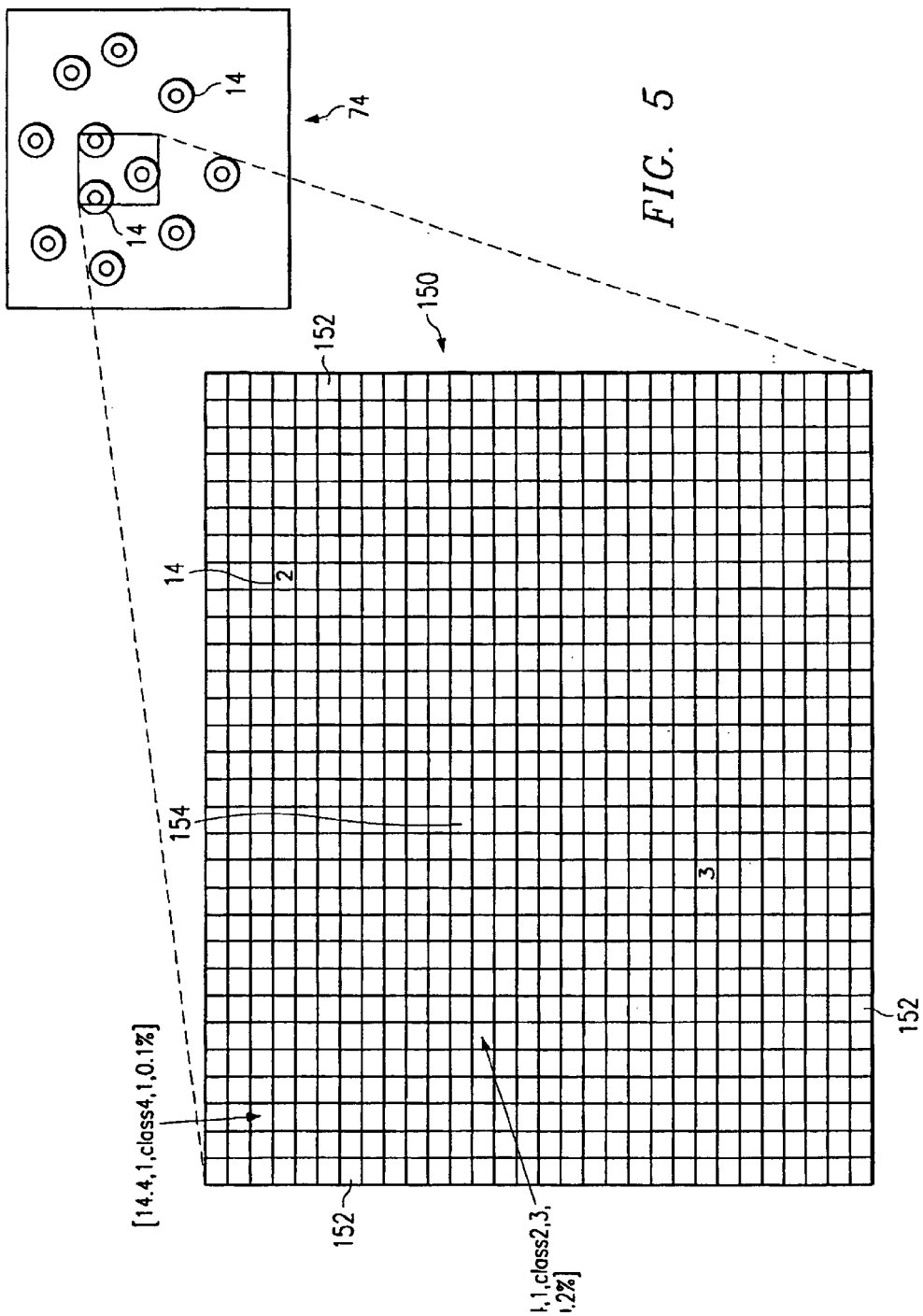
FIG. 5 is a graphical diagram illustrating the current usage and performance map of FIG. 2 in accordance with one embodiment of the present invention.

FIG. 5 illustrates the current usage map and performance map 74 in accordance with one embodiment of the present invention. In this embodiment, the current usage and performance map 74 is graphically illustrated with the corresponding data stored in a database table in the historical data 60 on a per geo-location and per-connection basis. As previously described, the current usage and performance map 74 indicates the current usage and performance in the specific geo-locations of the coverage area.

Referring to FIG. 5, the current usage and performance map 74 is maintained for all servers 14 in a geo-location area. The current usage and performance map 74 identifies the servers 14 and indicates their location. In one embodiment, as illustrated by zoomed area 150, the current usage and performance map 74 is subdivided into a plurality of bins 152 arranged in a grid. The data in the usage and performance map 74 may be generated and maintained on either a per-bin resolution or may be aggregated over several bins 152 and updated as the data per bin changes. In a particular embodiment, each bin 152 stores usage and performance data including data rate, activity, class or service type, primary server, neighboring servers, and current rate of call blocks or failures. In the current usage and other maps, the data rate is the peak rate. Together, the rate, activity, and class can be used to determine an average rate for a connection. At a minimum, the current usage map 74 should include the peak rate for each bin 152 or set of bins 152 in the geo-location. Other suitable use and performance data specific to that location may be also be included. For example, bin 154 may indicate a usage by an active call using 14.4 kbps data rate, with an activity factor of 1, call-type of class 4, served by server 1, no neighboring servers, and with a call block and/or failure rate of 0.1 percent. Current use for additional connections are illustrated in FIG. 5.

Figure 6:
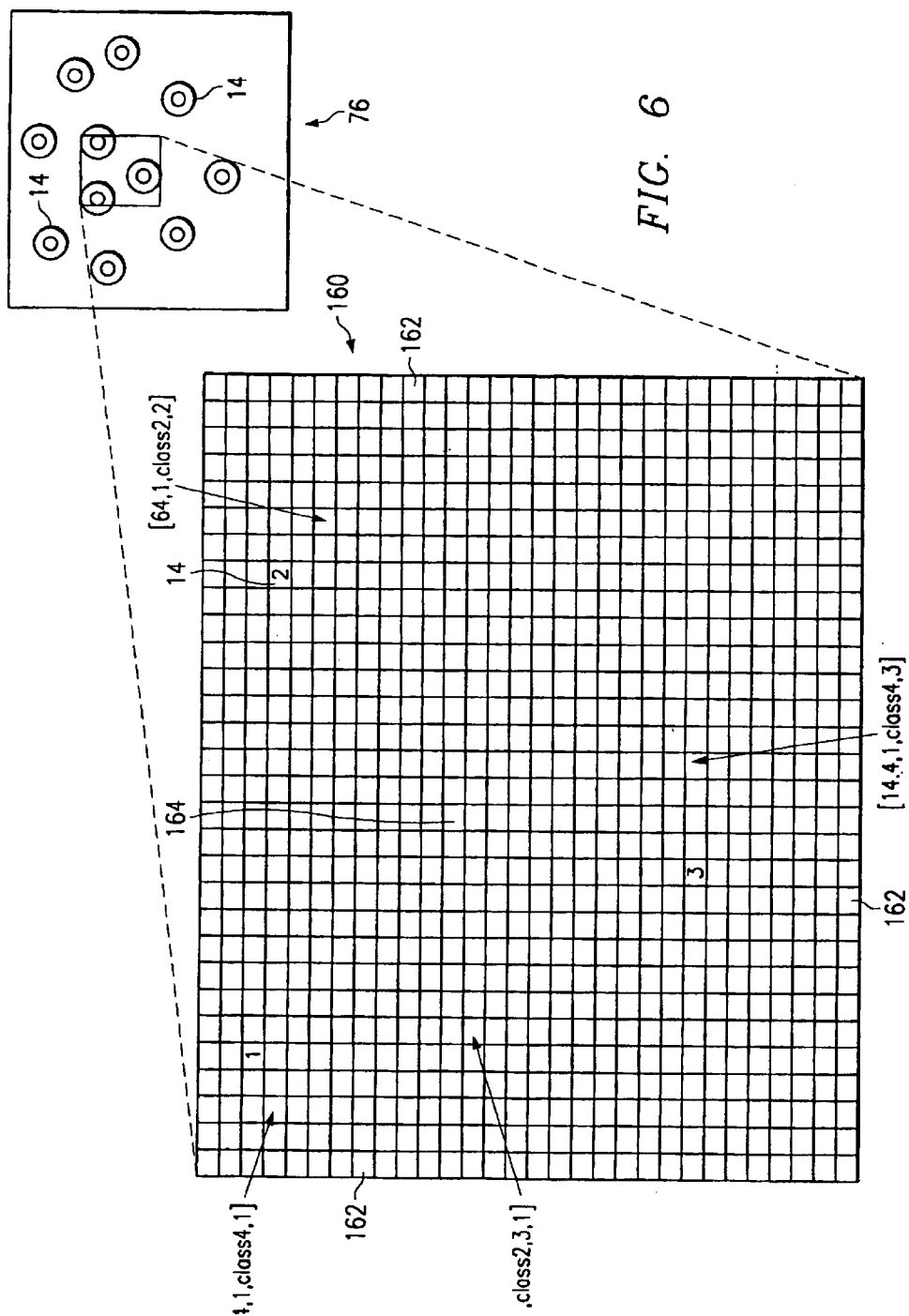
FIG. 6 is a graphical diagram illustrating the current demand map of FIG. 2 in accordance with one embodiment of the present invention.

FIG. 6 illustrates the current demand map 76 in accordance with one embodiment of the present invention. In this embodiment, the current demand map 76 is graphically illustrated with the corresponding data stored in a database table in the historical data 60 on a per geo-location and per-connection basis. As previously described, the current demand map 76 indicates the resource request at various locations at the current time.

Referring to FIG. 6, the current demand map 76 is maintained for all servers 14 and each of the geo-location areas. The current demand map 76 identifies the servers 14 and indicates their locations. In one embodiment, as illustrated by the zoomed area 160, the current demand map 76 is subdivided into a plurality of bins 162 arranged in a grid covering the geo-location. The data in the current demand map 76 may be generated and maintained on either a per-bin 162 resolution basis, or may be aggregated over several bins 162 and updated as the data per bin changes. In a particular embodiment, each bin 162 stores data for resource requests that include data rate, activity, class or service type, primary server, and neighboring servers. At a minimum, the current demand map 76 should include peak rates for connections in each bin 162 or set of bins 162. It will be understood that other data related to determining current demand at a geo-location may also be included. For example, bin 164 may include a resource request for a call using a 14.4 kbps data rate with an activity factor of 0.42, the call-type class of 1, served by server 1, and with neighboring servers 2 and 3. Expected demand for additional connections are illustrated in FIG. 6.

Figure 7:
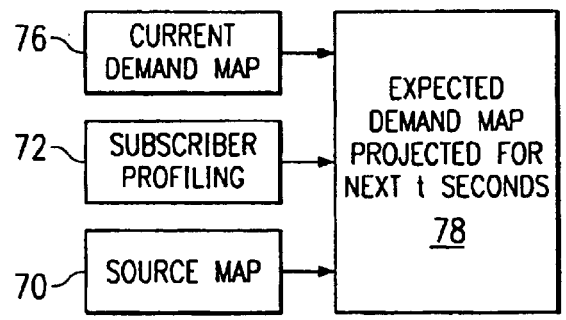
FIG. 7 is a flow diagram illustrating development of the expected demand map of FIG. 2 in accordance with one embodiment of the present invention.

FIG. 7 is a flow diagram illustrating generation, or development, of the expected demand map 78 in accordance with one embodiment of the present invention. The current demand map 76 is different than the current usage map 74 in that the expected demand includes unsatisfied demand that has been requested by mobile devices 18. In the illustrated embodiment, the expected demand map 78 is generated from data of the source map 70, subscriber profiling 72, and current demand map 74. In particular, current demand for each geo-location is altered based on the source map 70 for the geo-location and subscriber profiling 72 to estimate the expected demand. In estimating the expected demand, the source map 70 predicts the likelihood of businesses and other entities in each geo-location going active. The subscriber profiling 72 predicts when active connections will terminate and predicts when inactive devices will initiate a connection. These probabilities are used to alter the current demand map 76 to the expected demand for the next predefined period of time. The period of time may be a fraction of a second or several seconds in duration.

Figure 8:
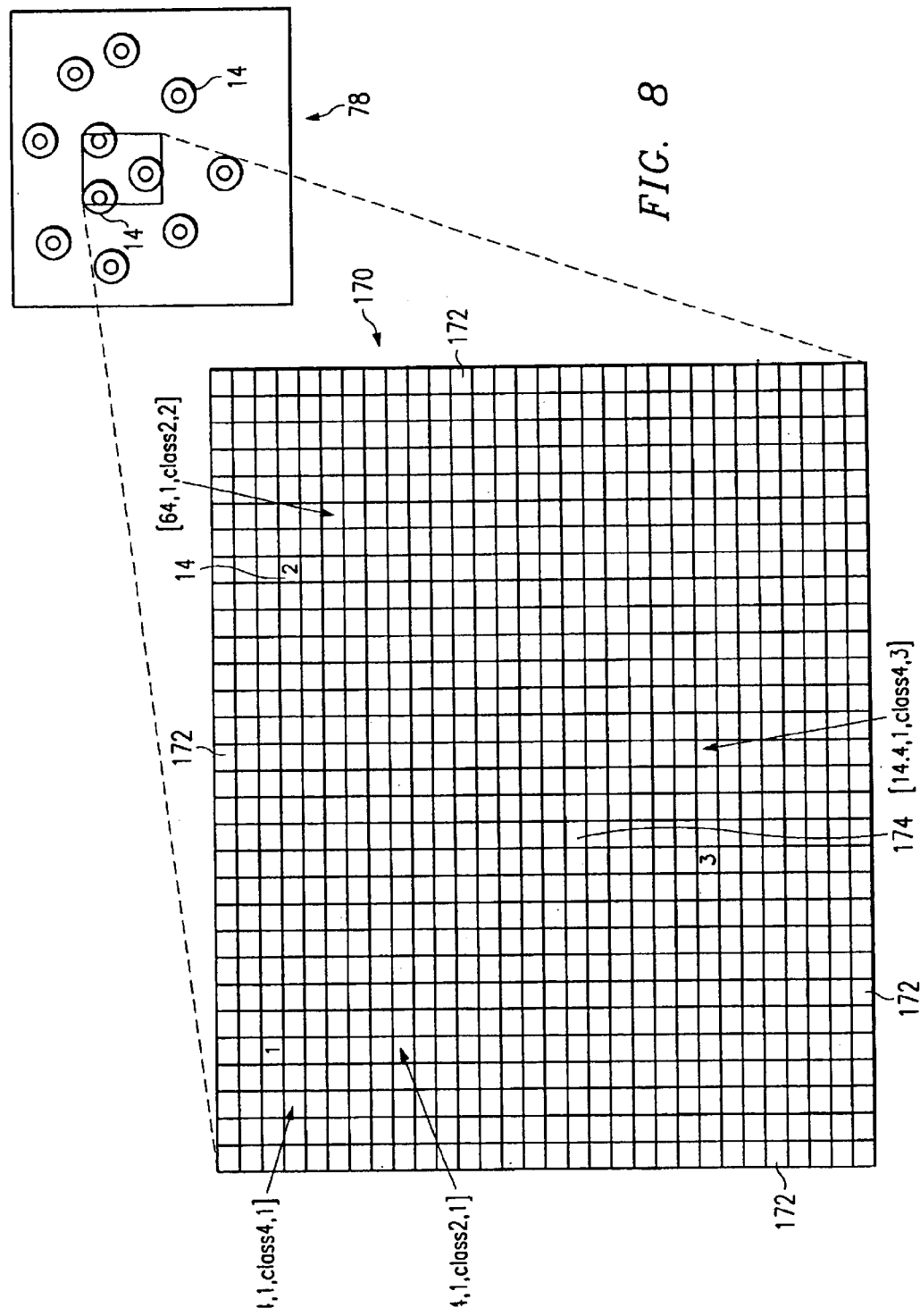
FIG. 8 is a graphical diagram illustrating the expected demand map of FIG. 2 in accordance with one embodiment of the present invention.

FIG. 8 illustrates the expected demand map 78 in accordance with one embodiment of the present invention. In this embodiment, the expected demand map 78 is graphically illustrated with the corresponding data stored in a database table on a per geo-location and per connection basis. The database table may be stored in the historical data 60. As previously described, the expected demand map 78 projects the expected resource request in some period of time in the future.

Referring to FIG. 8, the expected demand map 78 is maintained for all servers 14 in a geo-location. The expected demand map 78 identifies the servers 14 in the geo-location and indicates their location. In one embodiment, the expected demand map 78, as illustrated by zoomed area 170 is subdivided into a plurality of bins 172 arranged in a grid covering the geo-location. Data for the expected demand map 78 may be generated and maintained either on a per bin 172 resolution, or may be aggregated over several bins 172 and updated as the data per bin 172 changes. In a particular embodiment, each bin 172 stores expected demand data including data rate, activity, class or service type, primary server, and neighboring servers. For example, bin 174 may store expected demand by an active call that will use 14.4 kbps data rate with an activity factor of 0.42, cell-type of class 1, served by server 3 and with neighboring server 2. Expected demand for additional connections are illustrated in FIG. 8. At a minimum, the expected demand map 78 should include the peak rate for each bin, or set of bins in a geo-location. It will be understood that the expected demand map 78 may include additional or other information that can be used in determining, or estimating, expected demand within the wireless network 10.

Together, the current and expected demand maps 76 an 78 provide a profile within particular geo-location areas in the coverage area. This profile is time-variant and incorporates time sequential snap-shots of the geo-locations that tracts all bandwidth sinks within the area.

Figure 9:
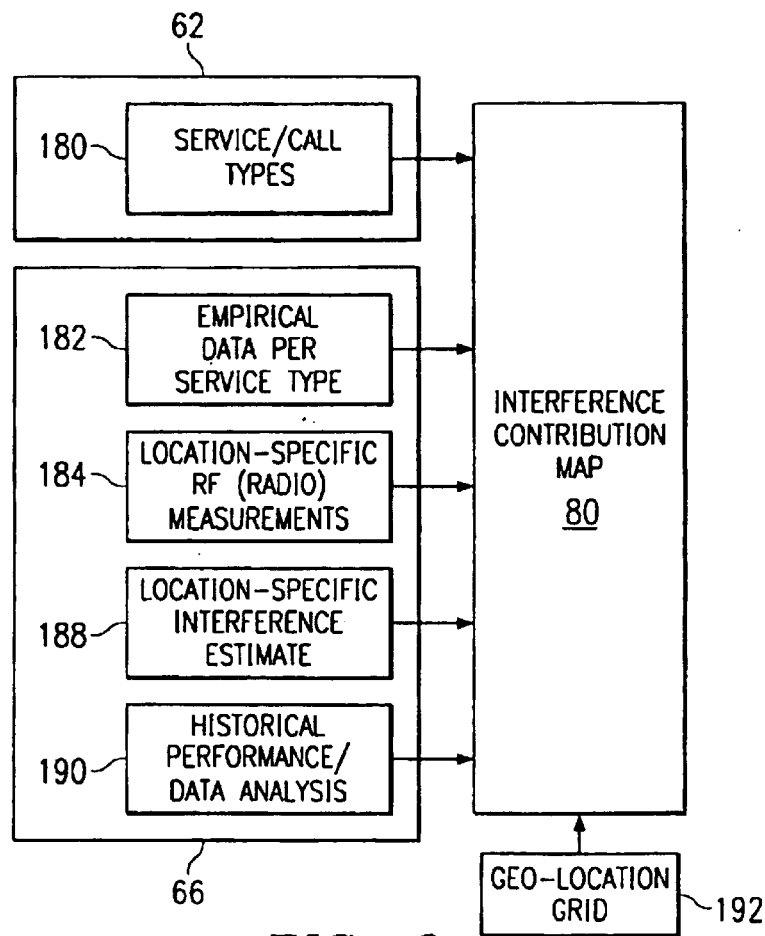
FIG. 9 is a flow diagram illustrating generation of the interference contribution map of FIG. 2 in accordance with one embodiment of the present invention.

FIG. 9 is a flow diagram illustrating generation of the interference contribution map 80 in accordance with one embodiment of the present invention. In this embodiment, the interference contribution map 80 indicates the expected resource usage for each class of service at each geo-location area.

Referring to FIG. 9, the interference contribution map 80 is generated using information and data on the various service and/or call types 180, empirical data per service type 182, location specific radio frequency measurements 184, location-specific interference estimates 188, and historical performance and/or data analysis 190. The empirical data per service type 182 provides power use on a per bandwidth basis. The location-specific radio frequency measurements 184 provide information on actual interference data. This information is used along with the geo-location grid 192 to generate the interference contribution map 80. The service and/or call types 180 may be obtained from the QoS policies and service level agreements 62. The remaining information may be obtained from the empirical, field, environmental data store 66.

Figure 10:
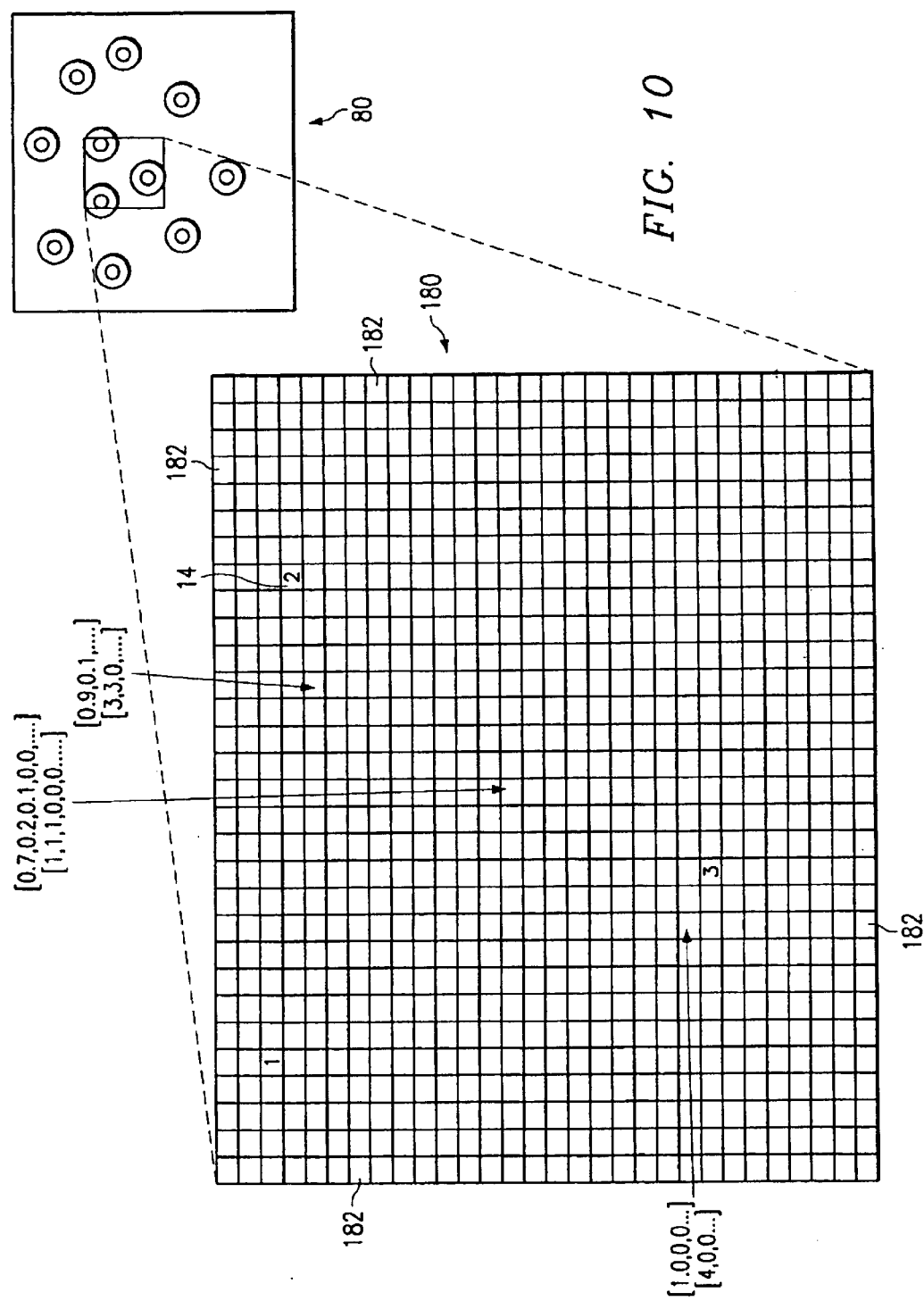
FIG. 10 is a graphical diagram illustrating the interference contribution map of FIG. 2 in accordance with one embodiment of the present invention.

FIG. 10 illustrates the interference contribution map 80 in accordance with one embodiment of the present invention. In this embodiment, the interference contribution map 80 is graphically displayed with the corresponding data being stored in the database table on a per geo-location and per service type basis. As previously described, the interference contribution map 80 indicates the expected resource usage of each class of service at specific geo-location areas.

Referring to FIG. 10, the interference contribution map 80 is maintained for all servers 14 in the geo-location. The interference contribution map 80 identifies the servers 14 and indicates their location. In one embodiment, as illustrated by zoomed area 180, the interference contribution map 80 is subdivided into a plurality of bins 182 arranged in a grid covering the geo-location. The data in the interference contribution map 80 may be generated and maintained on either a per-bin resolution, or may be aggregated over several bins 182 and updated as a data per bin changes. In a particular embodiment, the interference contribution map 80 maintains data on the probability of interference contribution to one or more servers and the value of interference contribution to the one or more servers. The value of interference contribution to one or more servers 14 is dependent on the call or service type and the geo-location. For example, a call with a full data rate of 14.4 kbps at a certain location may have an interference contribution value of 1 while a call with full data rate of 64 kbps at another or the same location may have an interference contribution value of 4. Similarly, a 64 kbps data call situated 0.2 miles from the server may have an interference contribution value significantly less than a 64 kbps call situated in an area between two servers 14 and spaced two miles apart from each server 14. The interference contribution values are generated from empirical data and may be refined via the use of field measurements, historical data analysis, and interference estimates. In this embodiment, the interference value is normalized to power or bandwidth. Each bin 182 provides a value and probability for interference from the bin 182 to each server 14.

In operation of the bandwidth allocation system 50, the interference contribution map 80 provides an important tool to allocate bandwidth in wireless and/mobile networks. The interference contribution map 80 captures the interdependence of bandwidth usage on various neighboring servers and the mobile devices 18. For example, in a forward-link limited CDMA system, a mobile unit demanding 64 kbps at a location which is very close to the server 14, may be granted the request while the request may be denied if the mobile unit 18 is located at the edge of the coverage of the server 14. This determination is based on the total power utilization in each of the servers 14 in the neighborhood. If the mobile unit 18 is close to the server 14, the transmitters in the communication would be transmitting less power, and hence would contribute less interference to the system, thus resulting in higher available bandwidth at certain other locations.

Figure 11:
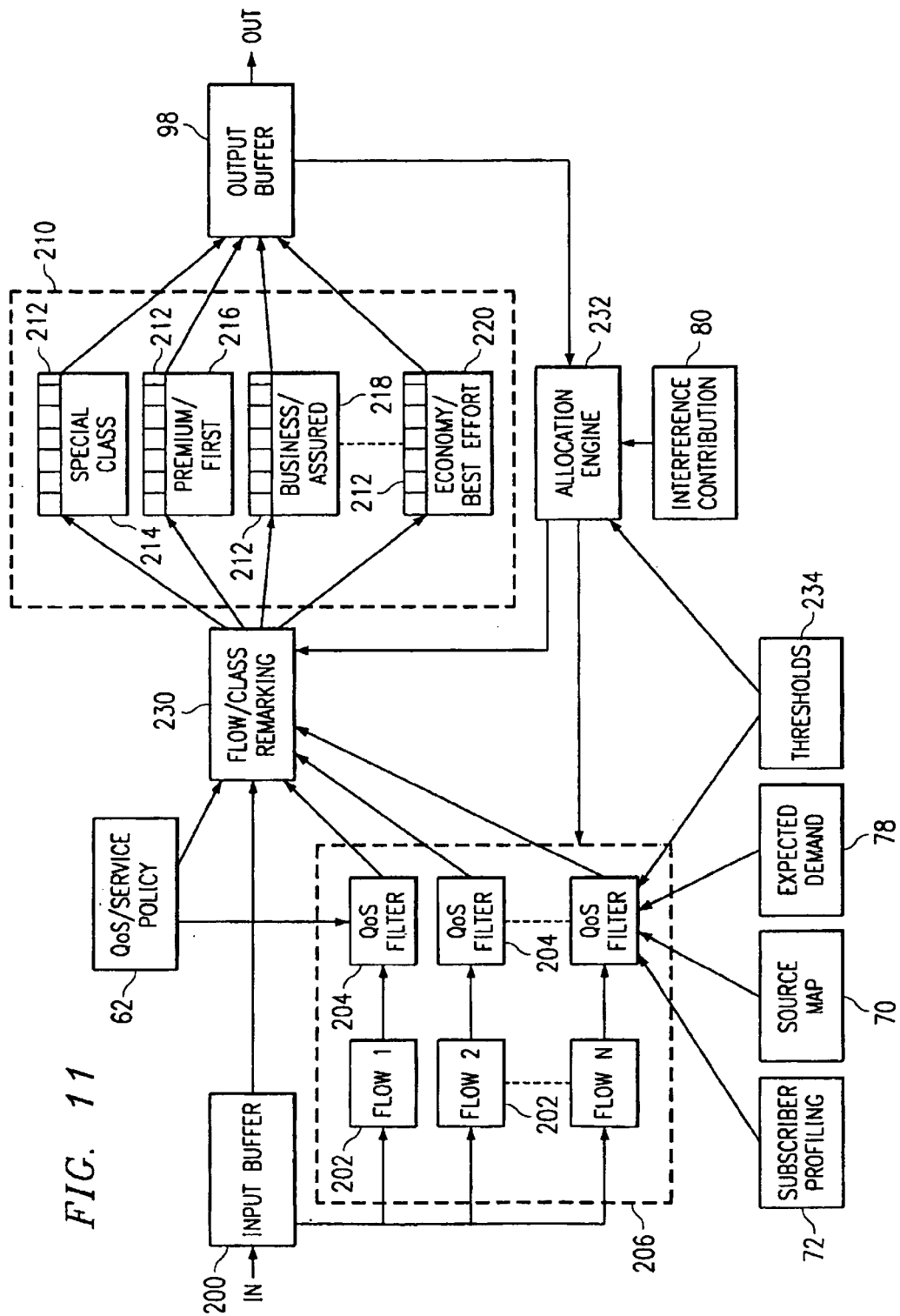
FIG. 11 is a flow diagram illustrating the allocation of bandwidth in the bandwidth allocation system of FIG. 2 in accordance with one embodiment of the present invention.

FIG. 11 is a flow diagram illustrating operation of the allocation subsystem 56 in connection with the tool subsystem 54 to allocate bandwidth and manage per-flow and per-location queues, or buffers. In this embodiment, bandwidth supply allocation is performed closely with the respective queue management for each flow, or connection. It will be understood that bandwidth may be otherwise allocated and queues otherwise managed using the interference contribution and other maps of the tools subsystem 54 without departing from the scope of the present invention.

Referring to FIG. 11, an input buffer 200 maintains a per-flow queue 202 for each active connection. Each per-flow queue 202 is managed via a per-flow QoS filter 204. The per-flow queues 202 and QoS filters 204 collectively form first state queues 206. In an alternate embodiment, the per-flow queues 202 in a same location with the same QoS provisioning may be aggregated into a per-QoS/per location queue and managed by a common per-flow QoS filter.

The QoS filter 204 may include constraints such as maximum average delay, maximum allowable delay, minimum data throughput guarantees, assured service, premium service, best effort service, and various other control parameters. The QoS filter constraints and control parameters may be location specific and time specific. For example, for a business e-mail service, the QoS constraints may include an average delay of 100 seconds, a maximum delay of 200 seconds, assured service, guaranteed and specified locations during specified times such as 9:00 a.m. to 5:00 p.m. during weekdays, and assured service with an average delay of 600 seconds in all other areas and times. Similarly, a business internet access service may include QoS constraints such as an average delay of 20 seconds, minimum throughput guarantee of 7.2 kbps in specified sectors from 7:00 a.m. to 11:00 a.m. and 2:00 p.m. to 4:00 p.m. during weekdays and best-effort service in all other sectors and all other times.

Second stage queues 210 are maintained on a per geo-location basis. The second stage queues 210 include a plurality of class queues 212. Usage or queue length of the class queues 212 is controlled to implement allocation and scheduling in the wireless system 10. In an exemplary embodiment, the class queues 212 include a VIP or special class queue 214, a premium or first-class queue 216, a business or assured class queue 218, and an economy or best effort queue 220. It will be understood that other or additional classes may be provided for in the second stage queue 210.

In operation, the transition of traffic from the first stage queues 206 to the second stage queues 210 is governed by the QoS filters 204, class remarking engine 230, and the allocation engine, or algorithms 232. The QoS filter 204 is governed by the current status of the per-flow queue 202, and the respective QoS policies 62. The QoS filter 204 is also governed by feedback of current allocations on a per geo-location basis, expected demand map 78, source maps 70, subscriber profiling 72, and location thresholds 234. The location thresholds 234 take into account reserved bandwidth and provide the maximum allocatable bandwidth for each server. The allocation engine 232 governs the remarking process. The interference contribution map 80, the per-sector thresholds 234, and current usage feedback from the output buffer 98 are used to determine the current bandwidth allocation to the per-sector queues.

Figure 12:
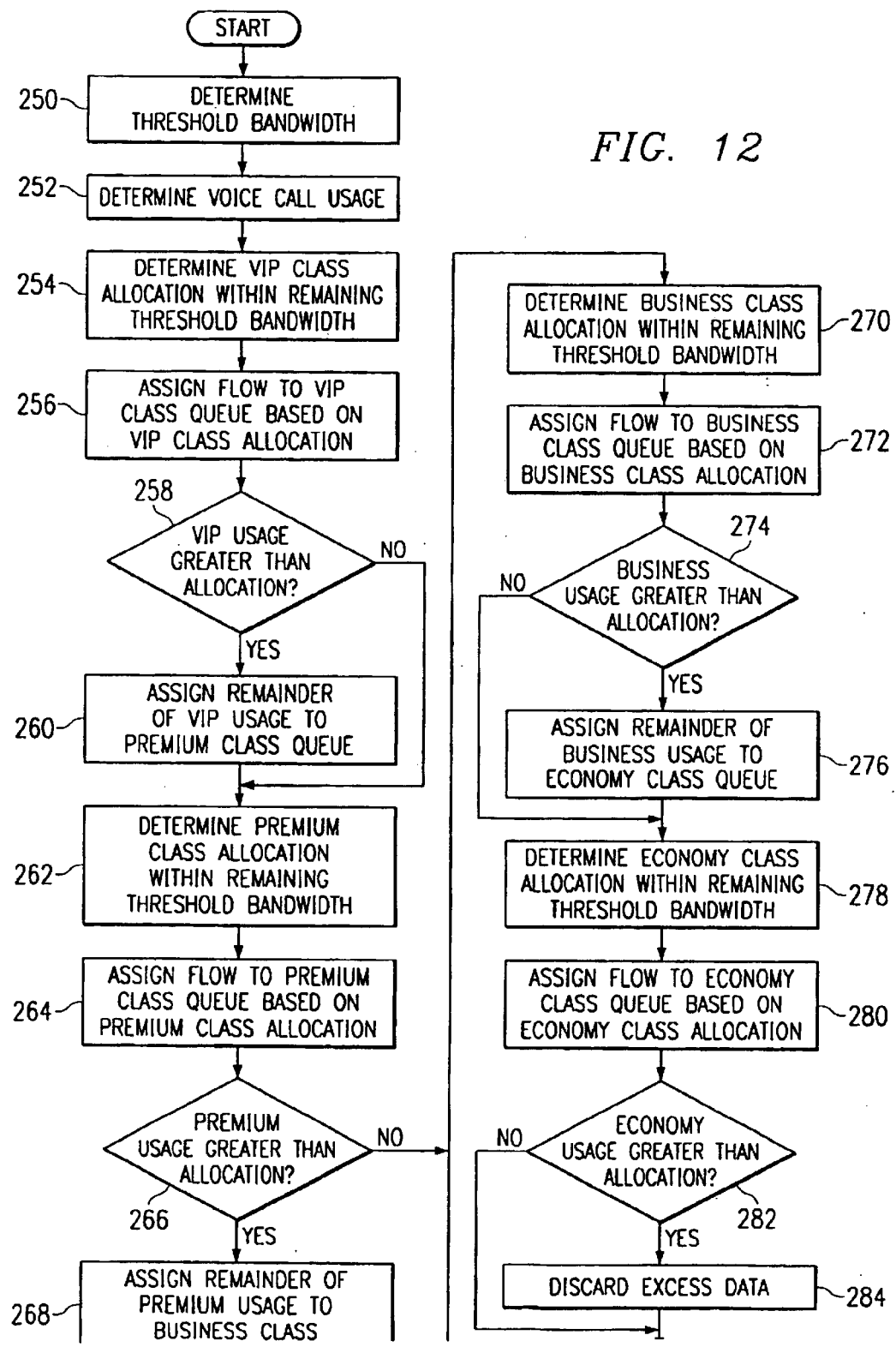
FIG. 12 is a flow diagram illustrating a method for allocating bandwidth in the allocation engine of FIG. 2 in accordance with one embodiment of the present invention.

FIG. 12 is a flow diagram illustrating bandwidth allocation by the allocation engine 232 in accordance with one embodiment of the present invention. In this embodiment, allocation is based on bandwidth usage. It will be understood that allocation may instead be based on demand or other suitable criteria. Also in this embodiment, geo-location resolution is equal to the resolution of a cell, which is a coverage area of a server 14. It will be understood that the geo-location resolution may be suitably increased or decreased without departing from the scope of the present invention. The method is repeated for each geo-location area to allocate bandwidth to the various traffic classes within that geo-location area.

Referring to FIG. 12, the method begins at step 250 in which threshold bandwidth for the geo-location area covered by the server 14 is determined. The threshold bandwidth takes into account bandwidth that may be reserved such that each class has at least a minimum bandwidth at all times in the geo-location area. Next, at step 252, voice call usage is determined. Voice call usage is a product of the usage, or allocation, of voice calls with the interference contribution matrix indicating the mutual dependence and/or interference of the server 14. In this way, the allocation engine 82 accounts for interference caused by voice calls within the geo-location area.

Proceeding to step 254, VIP class allocation is determined within the remaining threshold bandwidth. In one embodiment, the VIP class allocation is determined in accordance with Equation 1.

$$\vec{S} = \vec{T} - (\vec{I} \times \vec{V}) - (\vec{I} \times \vec{A}1) \quad \text{(Equation 1)}$$

Where: $\vec{S} \geq 0$ $\vec{T}$ = threshold bandwidth for cell servers $\vec{V}$ = usage/allocation of voice calls $\vec{I}$ = the interference contribution matrix $\vec{A}1$ = allocation to VIP queue for all servers S, T, V, I and A1 are vectors At step 256, flow to the VIP class queue 214 is assigned based on the VIP class allocation. In particular, all members of the current VIP class to VIP class usage. The QoS filters assign the appropriate flows to the VIP class queue 214 such that usage or queue 214 length of the VIP class queue does not exceed VIP allocation. At decisional step 258, it is determined whether VIP usage exceeds VIP allocation. If VIP usage exceeds VIP allocation, the Yes branch of decisional step 258 leads to step 260 in which the remainder of VIP usage is assigned to the next, or premium queue 216. The No branch of decisional step 258 and step 260 lead to step 262.

At step 262, premium class allocation is determined within the remaining threshold bandwidth. In one embodiment, premium class allocation is determined in accordance with Equation 2.

$$(\vec{S} = \vec{T} - (\vec{I} \times \vec{V}) - (\vec{I} \times \vec{U}1) - (\vec{I} \times \vec{A}2)) \quad \text{(Equation 2)}$$

Where: $\vec{S} \geq 0$ $\vec{U}1$ = VIP usage $\vec{A}2$ = premium class allocation S, U1, and A2 are vectors Next, at step 264, flow to the premium class queue 216 is assigned based on premium class allocation. In particular, all members of the current premium class are assigned to premium class usage. The QoS filters 204 assign the appropriate flows to the premium class queue 216 such that the usage or queue length of the premium class queue 216 does not exceed premium class allocation. At decisional step 266, it is determined whether premium usage exceeds premium class allocation. If premium class usage exceeds the allocation, the Yes branch of decisional step 266 leads to step 268 in which the remainder of the premium usage is assigned to the next, or business class. The No branch of decisional step 266 and step 268 lead to step 270.

At step 270, business class allocation is determined within the remaining threshold bandwidth. In one embodiment, business class allocation is determined in accordance with Equation 3.

$$\vec{S} = \vec{T} - (\vec{I} \times \vec{V}) - (\vec{I} \times \vec{U}1) - (\vec{I} \times \vec{U}2) - (\vec{I} \times \vec{A}3) \quad \text{(Equation 3)}$$

Where: $\vec{S} \geq 0$ $\vec{U}2$ = premium class usage $\vec{A}3$ = business class allocation S, U2 and A3 are vectors Proceeding to step 272, flow to the business class queue 218 is assigned based on business class allocation. In particular, all of the current business class traffic is assigned to business usage. The QoS filters 204, the appropriate flows are assigned to the business class queue 218 such that the usage or queue length of the business class 218 does not exceed business class allocation. At decisional step 274, it is determined whether business usage is greater than business allocation. If business usage is greater than business allocation, the Yes branch of decisional step 274 leads to step 276 in which the remainder of business usage is assigned to the economy class queue 220. Step 276 as well as the No branch of step 274 lead to step 278.

At step 278, economy class allocation is determined within the remaining threshold bandwidth. In one embodiment, economy class allocation is determined in accordance with Equation 4.

$$\vec{S} = \vec{T} - (\vec{I} \times \vec{V}) - (\vec{I} \times \vec{U}1) - (\vec{I} \times \vec{U}2) - (\vec{I} \times \vec{U}3) - (\vec{I} \times \vec{A}4) \quad \text{(Equation 4)}$$

Where: $\vec{S} \geq 0$ $\vec{U}3$ = business class usage $\vec{A}4$ = economy class allocation S, U3 and A4 are vectors Proceeding to step 280, flow to the economy class queue 220 is assigned based on economy class allocation. In particular, all members of the economy class are assigned to economy class usage. Of the QoS filters 204, the appropriate flows are assigned to the economy class queue 220 such that the economy usage does not exceed economy allocation. Step 280 leads to decisional 282. At decisional step 282 it is determined whether economy usage is greater than economy allocation. If economy usage is not greater than allocation then sufficient bandwidth is available to support all of the traffic classes within the geo-location area of the server 14 and the No branch of decisional step 282 leads to the end of the process. If economy usage is greater than allocation, the Yes branch of decisional step 282 leads to step 284. At step 284, the individual flows are kept in their per flow queues, or packets are discarded and the economy queue 220 is governed by the individual QoS filters 204. In this way, the usage, demand, interference contribution, and source map tools are used to allocate bandwidth within the wireless network 10. The supply allocation can be maintained on the geo-location basis as indicated by the bandwidth supply map 84.

Figure 13:
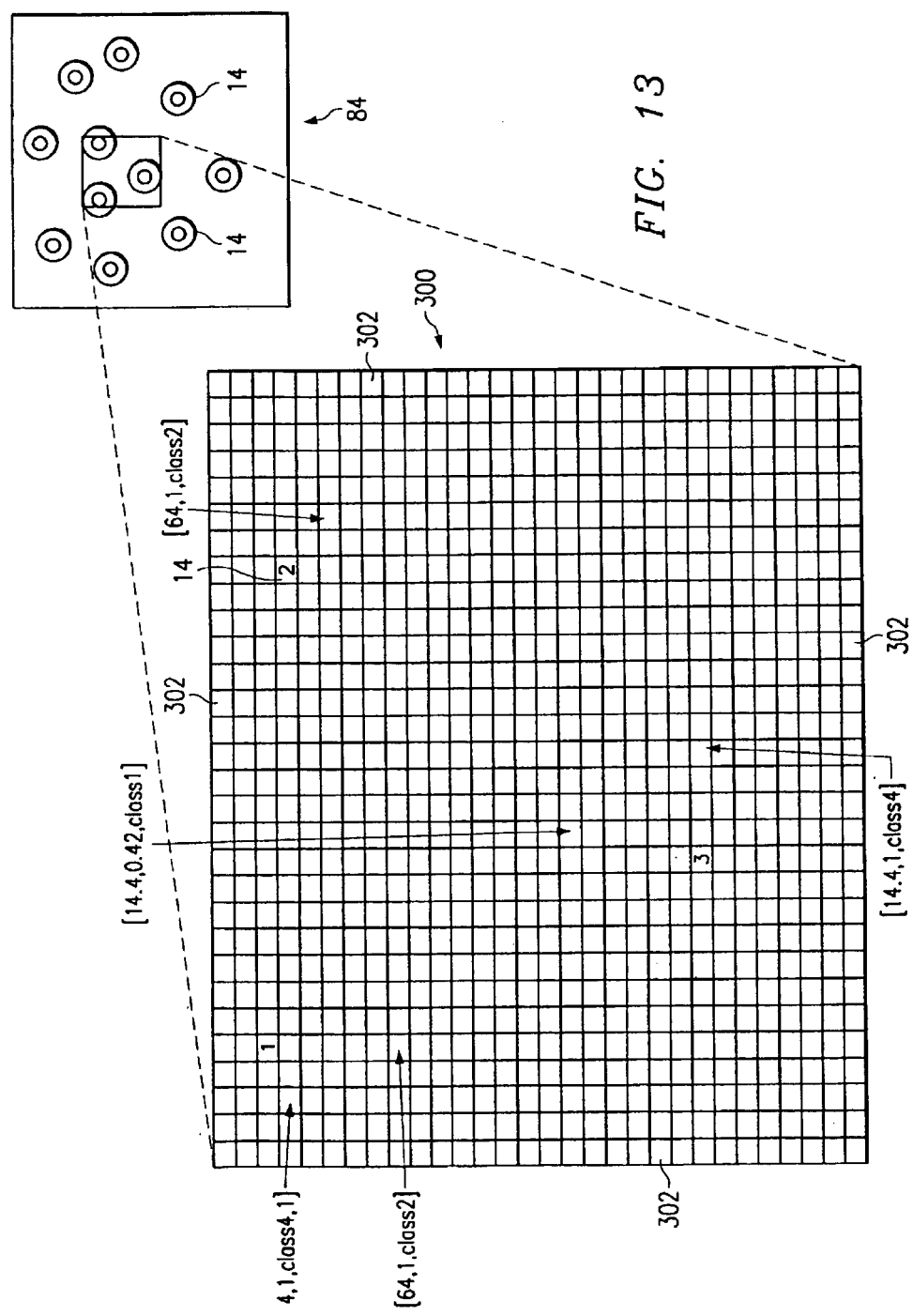
FIG. 13 is a graphical diagram illustrating the bandwidth supply allocation map of FIG. 2 in accordance with one embodiment of the present invention.

FIG. 13 illustrates the bandwidth supply map 84 in accordance with one embodiment of the present invention. In this embodiment, the bandwidth supply map 84 is graphically displayed with the corresponding data stored in database tables on a per geo-location and per class of service basis. The bandwidth supply map 84 indicates the amount of bandwidth that is potentially available at each geo-location. The map is not only geo-location specific, but is also time sensitive. In one embodiment, the map is updated every time a supply that is available for use is utilized, or the usage map changes.

Referring to FIG. 13, the bandwidth supply allocation map 84 is maintained for all servers 14 in a geo-location area. The map 84 identifies the servers 14 and indicates their location. In one embodiment, as illustrated by the zoomed area 300, the bandwidth supply allocation map 84 is subdivided into a plurality of bins 302 arranged in a grid covering the geo-location. The data in the bandwidth supply allocation map 84 may be generated and maintained on either a per bin resolution, or may be aggregated over several bins 302 and updated as a data per bin changes. In a particular embodiment, each bin 302 includes a rate and activity for each service class. Exemplary data for bins 302 is illustrated by FIG. 13.

The generation of the bandwidth supply allocation map 84 is based on computing the expected interference from the bandwidth usage in each geo-location, along with the real-time data on the actual bandwidth being utilized. In addition, other parameters and empirical data are used to estimate the total capacity available, the impact of interference, and the class of services supported, along with their characteristics. Additional tools such as geo-location specific RF propagation, drive test measurements, and other data may be used to fully estimate the interference impact and bandwidth availability impact.

The bandwidth supply allocation map 84 provides the mechanism to allocate limited resource bandwidth in a geo-location based on profiles of the source map 70, the demand map 78, the interference contribution map 80 as well as policy determinations by the owner of the bandwidth and user real-time utilization requirements. The overall bandwidth supply allocation map 84 is also modified by the cross-bandwidth pollution effects of different sources which tend to modify and attenuate the bandwidth available in a geo-location. The bandwidth supply allocation map 84 as well as the demand map 78 may also be modified by physical delivery limitations such as spectrum availability. In a normal iteration, the process will first establish the available bandwidth supply map, moderated by policy and quasi-static source map, view the pollution and interference effects of the geo-location and then re-allocate bandwidth on the basis of this feed-back loop.

The supply allocation map 84 may be used for real-time bandwidth brokering with wireless bit suppliers, brokering bandwidth access with consumers of bits, and other suitable applications in which bandwidth is exchanged, bought, sold, leased, or otherwise transferred or used. For real-time bandwidth brokering with wireless bit suppliers that provide application and content for wireless consumers, the supply allocation map 84 can be used to support negotiations with content providers such as YAHOO! to provide wireless internet access in certain locations within the cellular network 10. Also, a business or office building may subscribe to and demand certain QoS at or near the vicinity of the business and/or office. For brokering bandwidth access with consumers of bits that access certain applications or the internet using a mobile unit, access of bandwidth supply is controlled and/or managed via subscribed Qos parameters in the location of the users. Thus, for example, a subscriber who is not subscribed to a corporate premium service, may only be given limited bandwidth access in the vicinity of the corporate premium service area.

Figure 14:
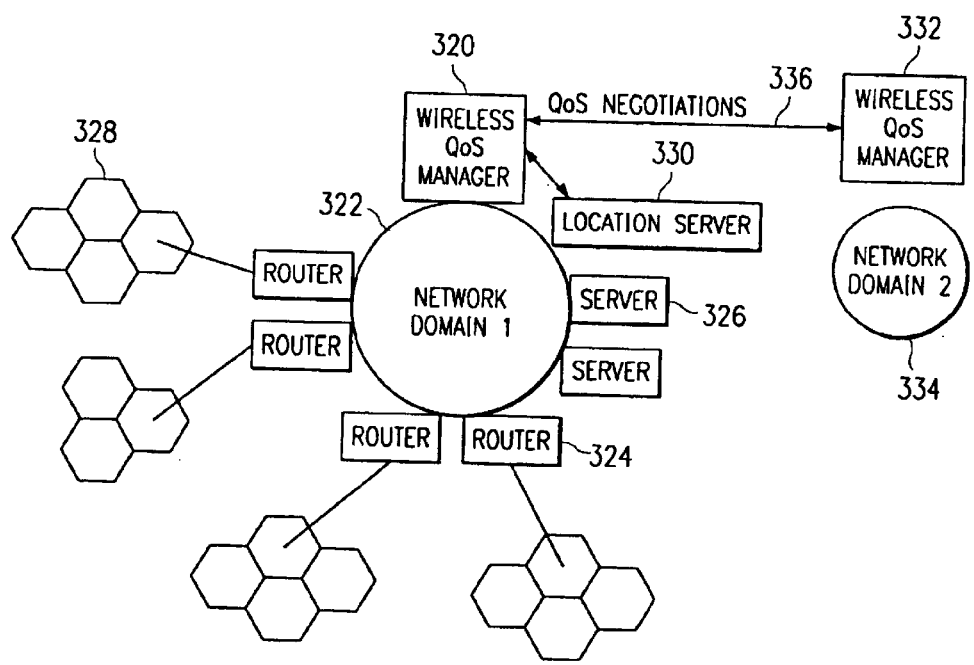
FIG. 14 is a block diagram illustrating a bandwidth broker for a wireless network in accordance with one embodiment of the present invention.

FIG. 14 illustrates implementation of the bandwidth allocation system 50 as a functional element of a wireless QoS manager 320 of a wireless network domain 322. The wireless network domain 322 may include multiple routers and/or IP gateways 324 and application servers 326. The wireless network domain 322 may support multiple cell sites 328. The bandwidth broker or Qos manager 320 interacts with a location server 330 to obtain the geo-location of each resource request and usage. The bandwidth broker or QoS manager 320 utilizes the bandwidth allocation system 50 to intelligently broker bandwidth based on time and space considerations such as the geo-location of the demand and supply. The QoS manager 320 interacts with QoS managers 332 of other network domains 334 to negotiate various QoS provisioning 336.

Accordingly, it can be seen that the above-described method and systems allow estimating and allocating bandwidth for mobile devices 18 dependent on its geo-location, QoS provisioning and mutual interference with other devices. Although the description above contains many specifics and examples, these should not be construed as limiting the scope of the invention. Various other embodiments and ramifications are possible. For example, instead of the use of bandwidth broker or QoS manager, the allocation algorithms and functions may be distributed to various network elements such as application servers, routers and/or IP gateways, or cell sites to effectively allocate bandwidth based on the geo-location of the mobile device, its resource request, interference contribution, and QoS provisionings. Furthermore, the queue controls and the management implemented as part of the bandwidth allocation methods and system may involve multi-stage queues or single-stage queues, or may involve procedures such as changing the flows received window size and the like.

What is claimed is:

1. A system for allocating bandwidth in a wireless communications network, comprising:
   a geo-location tool residing on a computer-readable medium, the geo-location tool operable to:
      receive data for a wireless communications network including a plurality of geo-location areas;
      estimate bandwidth parameters for a geo-location area on a per service class basis based on the data; and
      generate, based on the data, a current usage map indicating real-time bandwidth being utilized at the geo-location area, the current usage map being subdivided into a plurality of bins representing the geo-location area, each bin representing the location of a portion of the geo-location area and containing data associated with the corresponding portion of the geo-location area; and
   an allocation engine residing on the computer-readable medium, the allocation engine operable to allocate bandwidth in the geo-location area on the per service class basis based on its bandwidth parameters.

2. The system of claim 1, further comprising:
   the geo-location tool further operable to determine an allocation bandwidth for the geo-location area; and
   the allocation engine further operable to allocate bandwidth in the geo-location area based on the allocation bandwidth.

3. The system of claim 1, wherein the bandwidth parameters comprise at least one of a bandwidth usage and a bandwidth demand for the geo-location area.

4. The system of claim 1, wherein the bandwidth parameters comprise bandwidth interference contribution for the geo-location area.

5. The system of claim 1, wherein the data received by the geo-location tool comprises historic and service level data for the wireless communications network.

6. The system of claim 1, the geo-location tool further operable to generate, based on the data, a source map comprising sources of bit usage in the geo-location area and to estimate bandwidth parameters for the geo-location area based on the source map.

7. The system of claim 6, wherein the sources of bit usage comprise a high bandwidth use facility for which a contractual service level is provided by the wireless communications network.

8. The system of claim 6, wherein the sources of bit usage comprise an establishment for which local wireless access is provided by the wireless communications network at a contractual service level.

9. The system of claim 1, wherein the data comprises contractual service level data.

10. The system of claim 1, wherein the data comprises at least one of data measured from usage within the wireless communications network, radio frequency measurement, and interference estimates.

11. The system of claim 1, the geo-location tool further operable to generate, based on the data, a subscriber usage profile indicating the probability of a subscriber engaging in a connection at the geo-location area and to estimate bandwidth parameters based on the subscriber usage profile.

12. The system of claim 11, wherein the subscriber usage profile comprises mobility information for the subscriber.

13. The system of claim 11, wherein the subscriber usage profile comprises service class invocation information for the subscriber.

14. The system of claim 11, wherein the subscriber usage profile comprises call hold information for the subscriber.

15. The system of claim 1, wherein the current usage map comprises a peak rate for each active connection within the geo-location area.

16. The system of claim 15, wherein the current usage map comprises activity and service class information for each active connection within the geo-location area.

17. The system of claim 16, wherein the current usage map comprises primary and neighboring server information for each active connection within the geo-location area.

18. The system of claim 1, the geo-location tool further operable to generate, based on the data, a current demand map for the geo-location area based on the data.

19. The system of claim 18, wherein the current demand map comprises a peak rate for each active connection within the geo-location area.

20. The system of claim 19, wherein the current demand map comprises activity and service class information for each active connection within the geo-location area.

21. The system of claim 20, wherein the current demand map comprises primary and neighboring server information for each active connection within the geo-location area.

22. The system of claim 1, the geo-location tool further operable to generate, based on the data, an expected demand map for the geo-location area based on the data.

23. The system of claim 22, wherein the expected demand map comprises a peak rate for each potential connection within the geo-location area.

24. The system of claim 23, wherein the expected demand map comprises activity and service class information for each potential connection within the geo-location area.

25. The system of claim 24, wherein the expected demand map comprises primary and neighboring server information for each potential connection within the geo-location area.

26. The system of claim 1, the geo-location tool further operable to generate an interference contribution map indicating the impact on resource usage of supporting various bandwidths at the geo-location area based on the data.

27. The system of claim 26, the interference contribution map comprising an interference contribution value and a probability for each of a plurality of service classes associated with bandwidths at one or more sectors within the geo-location area.

28. The system of claim 26, wherein the interference contribution map indicates expected resource usage for each of a plurality of service classes at the geo-location area.

29. The system of claim 2, the allocation engine further operable to generate a bandwidth supply map indicating the available bandwidth at the geo-location area based on the allocation bandwidth, a total bandwidth, and an interference contribution bandwidth for the geo-location area.

30. A method for allocating bandwidth in a wireless communications network, comprising:
   receiving data for a mobile network including a plurality of geo-location areas;
   estimating bandwidth parameters for a geo-location area on a per service class basis based on the data;
   generating a current usage map indicating real-time bandwidth being utilized at the geo-location area, the current usage map being subdivided into a plurality of bins representing the geo-location area, each bin representing the location of a portion of the geo-location area and containing data associated with the corresponding portion of the geo-location area; and allocating bandwidth in the geo-location area on the per service class basis based on the bandwidth parameters.

31. The method of claim 30, further comprising:

determining allocation bandwidth for the geo-location area based on the data; and allocating bandwidth in the geo-location area based on the allocation bandwidth.

32. The method of claim 30, wherein the bandwidth parameters comprise at least one of a bandwidth usage and a bandwidth demand for the geo-location area.

33. The method of claim 30, wherein the bandwidth parameters comprise bandwidth interference contribution for the geo-location area.

34. The method of claim 30, wherein the data comprises historic and service level data for the wireless communication network.

35. The method of claim 30, further comprising:

generating, based on the data, a source map comprising sources of bit usage in the geo-location area; and estimating bandwidth parameters for the geo-location area based on the source map.

36. The method of claim 35, wherein the sources of bit usage comprise a high bandwidth use facility for which a contractual service level is provided by the wireless communications network.

37. The method of claim 35, wherein the sources of bit usage comprise an establishment for which local wireless access is provided by the wireless communication network at a contractual service level.

38. The method of claim 30, wherein the data comprises contractual service level data.

39. The method of claim 30, wherein the data comprises at least one of data measured from usage within the wireless communications network, radio frequency measurements, and interference estimates.

40. The method of claim 30, further comprising:

generating, based on the data, a subscriber usage profile providing the probability of a subscriber engaging in a connection at the geo-location area; and estimating bandwidth parameters based on the subscriber usage profile.

41. The method of claim 40, wherein the subscriber usage profile comprises mobility information for this subscriber.

42. The method of claim 40, wherein the subscriber usage profile comprises service class invocation information for this subscriber.

43. The method of claim 40, wherein the subscriber usage profile comprises call hold information for this subscriber.

44. The method of claim 30, wherein the current usage map comprises a peak rate for each active connection within the geo-location area.

45. The method of claim 44, wherein the current usage map comprises activity and service class information for each active connection within the geo-location area.

46. The method of claim 45, wherein the current usage map comprises primary and neighboring server information for each active connection within the geo-location area.

47. The method of claim 30, further comprising generating a current demand map for the geo-location area based on the data.

48. The method of claim 47, wherein the current demand map comprises a peak rate for each active connection within the geo-location area.

49. The method of claim 48, wherein the current demand map comprises activity and service class information for each active connection within the geo-location area.

50. The method of claim 49, wherein the current demand map comprises primary and neighboring server information for each active connection within the geo-location area.

51. The method of claim 30, further comprising generating an expected demand map for the geo-location area based on the data.

52. The method of claim 51, wherein the expected demand map comprises a peak rate for each potential connection within the geo-location area.

53. The method of claim 52, wherein the expected demand map comprises activity and service class information for each potential connection within the geo-location area.

54. The method of claim 53, wherein the expected demand map comprises primary and neighboring server information for each potential connection within the geo-location area.

55. The method of claim 30, further comprising generating an interference contribution map indicating the impact on resource usage of supporting various bandwidths at the geo-location area based on the data.

56. The method of claim 55, wherein the interference contribution map comprises an interference contribution value and a probability for each of a plurality of service classes associated with disparate bandwidths at one or more sectors within the geo-location area.

57. The method of claim 55, wherein the interference contribution map indicates expected resource usage for each of a plurality of service classes at the geo-location area.

58. The method of claim 31, further comprising generating a bandwidth supply map indicating the available bandwidth at the geo-location area based on the allocation bandwidth, a total bandwidth, and an interference contribution bandwidth for the geo-location area.

* * * * *

UNITED STATES PATENT AND TRADEMARK OFFICE
CERTIFICATE OF CORRECTION

PATENT NO. : 6,850,764 B1
APPLICATION NO. : 09/466308
DATED : February 1, 2005
INVENTOR(S) : Achal R. Patel It is certified that error appears in the above-identified patent and that said Letters Patent is hereby corrected as shown below:

Title page,
Item [56], References Cited, U.S. PATENT DOCUMENTS, insert

| | | | | |
|---|---|---|---|---|
| --5,561,839 | | 10/1996 | Osterberg et al. | 455/33.1 |
| 5,603,085 | | 02/1997 | Shedlo | 455/33.1 |
| 5,987,326 | | 11/1999 | Tiedemann, Jr. et al. | 455/442 |
| 6,021,309 | | 02/2000 | Sherman et al. | 455/12.1 |
| 5,257,283 | | 10/1993 | Gilhousen et al. | 375/1 |
| 5,734,967 | | 03/1998 | Kotzin et al. | 455/63 |
| 5,745,480 | | 04/1998 | Behtash et al. | 370/252 |
| 5,768,260 | | 06/1998 | Lindgren et al. | 370/252 |
| 5,805,585 | | 09/1998 | Javitt et al. | 370/342 |
| 5,862,485 | | 01/1999 | Linneweh, Jr. et al. | 455/450 |
| 5,923,650 | | 07/1999 | Chen et al. | 370/331 |
| 5,995,805 | | 11/1999 | Ogasawara et al. | 455/13.1 |
| 6,070,084 | | 05/2000 | Hamabe | 455/522 |
| 6,157,668 | | 12/2000 | Gilhousen et al. | 375/130 |
| 6,181,738 | B1 | 01/2001 | Chheda et al. | 375/224 |
| 6,226,283 | B1 | 05/2001 | Neumiller et al. | 370/340-- |

Title page,
Item [56], References Cited, FOREIGN PATENT DOCUMENTS, insert

| | | | |
|---|---|---|---|
| --WO | 98/52288 | 11/1998 | H04B/1/00, 15/00 |
| EP | 1 041 850 A1 | 10/2000 | H04Q/7/38 |
| EP | 0 831 669 A2 | 03/1998 | H04Q/7/38 |
| EP | 0 841 763 A1 | 05/1998 | H04B/7/26 |
| WO | 98/45966 | 10/1998 | H04B/7/24 |
| WO | 99/53630 | 10/1999 | H04B/7/005-- |

Title page,
Item [56], References Cited, OTHER PUBLICATIONS, insert

--International Seach Report in PCT International Application No. PCT/US 99/30155, dated November 5, 2000

"CA *net II Differentiated Services. Bandwidth Broker System Specification," British Columbia Institute of Technology, Technology Centre, Group for Advanced Information Technology, http://www.internet2.edu/qos/gbone/QBBAC.shtml, Online 4 October 1998, XP-002136418, pp. 1-13

UNITED STATES PATENT AND TRADEMARK OFFICE
CERTIFICATE OF CORRECTION

PATENT NO. : 6,850,764 B1
APPLICATION NO. : 09/466308
DATED : February 1, 2005
INVENTOR(S) : Achal R. Patel It is certified that error appears in the above-identified patent and that said Letters Patent is hereby corrected as shown below:

*Data Networks*, Bertsekas et al., 1987

"On the Capacity of a Cellular CDMA System," Gilhousen et al., *IEEE* 1991, 10 pages "Erlang Capacity of a Power Controlled CDMA System," Viterbi et al., *IEEE* 1993, 9 pages U.S. Patent Application Serial No. 09/513,913, entitled "Method and System for Managing Transmission Resources in a Wireless Communications Network," filed February 25, 2000, 73 pages U.S. Patent Application Serial No. 09/513,090, entitled "Method and System for Configuring Wireless Routers and Networks," filed February 25, 2000, 94 pages U.S. Patent Application Serial No. 09/513,592, entitled "Method and System for Brokering Bandwidth in a Wireless Communications Network," filed February 25, 2000, 50 pages U.S. Patent Application Serial No. 09/513,912, entitled "Method and System for Queuing Traffic in a Wireless Communications Network," filed February 25, 2000, 94 pages U.S. Patent Application Serial No. 09/591,077, entitled "Method and System for Dynamic Soft Handoff Resource Allocation in a Wireless Network," filed June 9, 2000, 66 pages U.S. Patent Application Serial No. 09/908,225, entitled "Method and System of Integrated Rate Control for a Traffic Flow Across Wireline and Wireless Networks," filed July 18, 2001, 32 pages "TCP and Explicit Congestion Notification," Floyd, Lawrence Berkeley Laboratory, DE-AC03-76SF00098, 16 pages B. Bakshi, et al., "Improving Performance of TCP over Wireless Networks," IEEE 17th International Conference on Distributed Computing Systems, May 1997, 10 pages Timothy Ju and Gary Ogasawara, "Congestion Control By Traffic Shaping for Ground/Satellite Network," XP-002140800, Milcom '97 Proceedings, November 2-5, 1997, 5 pages

UNITED STATES PATENT AND TRADEMARK OFFICE
CERTIFICATE OF CORRECTION

PATENT NO. : 6,850,764 B1
APPLICATION NO. : 09/466308
DATED : February 1, 2005
INVENTOR(S) : Achal R. Patel It is certified that error appears in the above-identified patent and that said Letters Patent is hereby corrected as shown below:

U.S. Patent Application Serial No. 09/174,273, entitled "Method and Apparatus for Class Based Transmission Control of Data Connections Based on Real-Time External Feedback Estimates Obtained Using Messaging from a Wireless Network," filed October 16, 1998, 35 pages S. Biaz and N. Vaidya, "Discriminating Congestion Losses from Wireless Losses using Inter-Arrival Times at the Receiver," IEEE Symposium Application-Specific Systems and Software Engineering Technology (ASSET), March 1999, 8 pages G. Holland and N.H. Vaidya, "Analysis of TCP Performance over Mobile Ad Hoc Networks," Fifth Annual ACM/IEEE International Conference on Mobile Computing and Networking (MOBICOM), August 1999, 13 pages G. Holland and N.H. Vaidya, "Impact of Routing and Link Layers on TCP Performance in Mobile Ad Hoc Networks," IEEE Wireless Communications and Networking Conference (WCNC), October 1999, 5 pages U.S. Patent Application Serial No. 09/513,914, entitled "Wireless Router and Method for Processing Traffic in a Wireless Communications Network," filed February 25, 2000, 87 pages--

Signed and Sealed this

Seventeenth Day of October, 2006

JON W. DUDAS
*Director of the United States Patent and Trademark Office*